(12) United States Patent
Langford et al.

(10) Patent No.: US 11,840,895 B2
(45) Date of Patent: Dec. 12, 2023

(54) THREADED CONNECTION PARTIALLY IN A SELF-LOCKING ENGAGEMENT

(71) Applicants: VALLOUREC OIL AND GAS FRANCE, Aulnoye-Aymeries (FR); NIPPON STEEL CORPORATION, Chiyoda-ku (JP)

(72) Inventors: Steve Langford, Boulogne-Billancourt (FR); Wesley Ott, Boulogne-Billancourt (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 328 days.

(21) Appl. No.: 16/754,031

(22) PCT Filed: Oct. 2, 2018

(86) PCT No.: PCT/EP2018/076734
§ 371 (c)(1),
(2) Date: Apr. 6, 2020

(87) PCT Pub. No.: WO2019/076622
PCT Pub. Date: Apr. 25, 2019

(65) Prior Publication Data
US 2020/0325734 A1    Oct. 15, 2020

(30) Foreign Application Priority Data

Oct. 20, 2017    (EP) .................................... 17306444

(51) Int. Cl.
*E21B 17/043*    (2006.01)
*F16L 15/00*    (2006.01)
(Continued)

(52) U.S. Cl.
CPC .......... *E21B 17/043* (2013.01); *F16L 15/004* (2013.01); *E21B 17/046* (2013.01); *F16L 15/06* (2013.01); *F16L 2201/40* (2013.01)

(58) Field of Classification Search
CPC ..... F16L 15/06; D21B 17/043; D21B 17/042; E21B 17/043; E21B 17/042
See application file for complete search history.

(56) References Cited

U.S. PATENT DOCUMENTS 4,582,348 A * 4/1986 Dearden ............... E21B 17/042
                                                          411/413
4,600,224 A * 7/1986 Blose .................. E21B 17/0423
                                                          285/333
(Continued)

FOREIGN PATENT DOCUMENTS

DE        4345119 C1    5/1995
WO    2007/149673 A1   12/2007
(Continued)

OTHER PUBLICATIONS

International Search Report dated Dec. 19, 2018 in PCT/EP2018/076734 filed Oct. 2, 2018.
(Continued)

*Primary Examiner* — David Bochna
(74) *Attorney, Agent, or Firm* — Oblon, McClelland, Maier & Neustadt, L.L.P.

(57) ABSTRACT

A threaded connection partially in a self-locking arrangement includes a first and a second tubular component provided respectively with male and female threaded zone at their respective ends. Only a portion of a first portion with varying thread width of the male threaded zone cooperates by self-locking tightening with only a portion of the second portion with varying thread width of the female threaded zone when made up one into the other. The connection is
(Continued)

able to withstand high torques required for special applications such as drilling with casing or intermediate casing.

25 Claims, 3 Drawing Sheets

(51) Int. Cl.
  *E21B 17/046* (2006.01)
  *F16L 15/06* (2006.01)

(56) References Cited

U.S. PATENT DOCUMENTS

| | | | |
|---|---|---|---|
| 5,338,074 A | 8/1994 | Barringer et al. | |
| 6,158,785 A | 12/2000 | Beaulier et al. | |
| 6,206,436 B1 | 3/2001 | Mallis | |
| 7,475,917 B2 | 1/2009 | Sivley, IV et al. | |
| 7,828,337 B2 | 11/2010 | Reynolds, Jr. | |
| 7,850,211 B2 | 12/2010 | Reynolds, Jr. et al. | |
| 2004/0251686 A1* | 12/2004 | Otten | E21B 17/042 285/333 |
| 2006/0145477 A1 | 7/2006 | Reynolds, Jr. | |
| 2006/0145480 A1 | 7/2006 | Mallis et al. | |
| 2006/0261595 A1 | 11/2006 | Verger et al. | |
| 2008/0054633 A1 | 3/2008 | Reynolds | |
| 2011/0278838 A1 | 11/2011 | Martin et al. | |
| 2012/0074693 A1* | 3/2012 | Mallis | E21B 17/0423 285/334 |
| 2014/0203556 A1 | 7/2014 | Besse | |
| 2016/0186899 A1 | 6/2016 | Besse | |
| 2016/0208962 A1 | 7/2016 | Sugino et al. | |
| 2018/0223606 A1* | 8/2018 | Rueda | E21B 17/042 |
| 2021/0246737 A1* | 8/2021 | Oku | E21B 17/042 |

FOREIGN PATENT DOCUMENTS

| | | |
|---|---|---|
| WO | 2008/116891 A1 | 10/2008 |
| WO | 2011/060894 A2 | 5/2011 |
| WO | 2017/024208 A1 | 2/2017 |

OTHER PUBLICATIONS

Notice of Opposition to EP3473798 of Vallourec Oil & Gas France and Nippon Steel Corporation by Hydril Company (27 pages).
Interlocutory decision in opposition proceedings mailed Jan. 17, 2023 in corresponding European Patent Application No. 17 306 444.5 (16 pages).

* cited by examiner

THREADED CONNECTION PARTIALLY IN A SELF-LOCKING ENGAGEMENT

BACKGROUND

The present invention relates to a threaded connection partially in a self-locking engagement. The threaded connection comprises a first and a second tubular component, one being provided at one end with a tubular male member and the other being provided at another end with a tubular female member, each member being provided with a threaded zone. According to the invention, only a portion of the threaded zone with varying thread width of the male member cooperate by self-locking tightening with a portion of the threaded zone with varying thread width of the female member when made up one into the other. In other words, only a portion of each of the threaded zones with varying thread width are locking. The connection according to the invention is able to withstand high torques required for special applications such as drilling with casing. The present invention design suits uses for development or exploration wells, including deep water. Applications will be particularly suited for intermediate casing.

In known fashion, it is conventional to connect tubes by make-up, said tubes being intended to constitute a casing or a tubing string in the context of operating a hydrocarbon well. In general, such tubes comprise an end provided with a male threaded zone and an end provided with a female threaded zone each intended to be assembled by make-up with the corresponding end of another component, the assembly defining a connection. The string thus constituted may also be rotated when drilling with casing of the well. For this reason, the components must be made up together with a high torque in order to be able to transmit a rotational torque which is sufficient to allow the string to be advanced into the well and also not to break it out. For conventional products, the make-up torque is generally reached thanks to cooperation by tightening of the abutment surfaces provided on each of the components, which are to be made up. However, because the extent of the abutment surfaces is a fraction of the thickness of the tubes, the critical plastication threshold of the abutment surfaces is rapidly reached when too great a make-up torque is applied.

For this reason, developments dedicated, for example, to connections such as those sold by the Applicant under the trade name VAM® HTF were made, in particular as regards the threading, in order to be able to withdraw from the abutment surfaces at least part or all of the loads which they are not able to accommodate. The aim was achieved using self-locking threading as described for example in document U.S. Pat. No. 7,661,728. In self-locking threading of that type of connection, as also described in the prior art U.S. Re 30,647 and U.S. Re 34,467, the threads of the male end (also termed PIN member) and the threads of the female end (also termed BOX member) have a constant lead but variable thread widths, because lead of the stab flanks is not equal to the lead of the load flanks. That type of connection is said wedge threads.

Conventionally, the thread of the male end has a pin thread crest, a pin thread root, a pin load flank, and a pin stab flank. The thread of the female end has a box thread crest, a box thread root, a box load flank, and a box stab flank. More precisely with wedge thread, the widths of the crests of the threads (or teeth) increase progressively for the threads of the male end or female end respectively with increasing distance from the male axial end or female axial end respectively.

Wedge threads are characterized by a wedge ratio, which is a non-zero difference between Load Flank lead LF and Stab Flank lead SF, Load Flank lead LF being either strictly greater or strictly smaller than Stab Flank lead SF, difference being calculated with the respective lead values. In conventional wedge thread, LF of both pin member and box member are equal, and respectively, SF of both pin member and box member are also equal. Thus, wedge ratio are the same for both the pin member and the box member. During make-up, the male and female threads (or teeth) finish by locking into each other in a predictable position corresponding to a locking point.

More precisely, locking occurs for self-locking threading when both all the stab flanks and all the load flanks of the male threads (or teeth) lock against respectively all the stab flanks and all the load flanks of the corresponding female threads (or teeth). For this reason, the make-up torque is taken by all of the contact surfaces between the flanks, i.e. a total surface area which is very substantially greater than that constituted by the abutment surfaces of the prior art.

It is also known from US-2011-278838, another type of self-locking threading wherein the male threaded zone comprises two portions. The pin stab flank lead SFP_p has a first value SFP_p1 in a first portion and gets a second value SFP_p2 in a second portion, the second value being equal to the pin load flank lead LFP_p, pin load flank lead LFP_p remaining constant over the first and second portions. The first portion is closest to the male distal end than the second portion. Distance VPEST locates where the first portion ends, and where the second portion starts. From male distal end to VPEST, the first portion is of the self-locking type with increasing teeth width. From VPEST, the second portion of the male threaded zone starts with constant tooth and root width. The width of the thread crest from VPEST towards the pipe body remains constant throughout that second portion of the male threaded zone.

For that connection, the female threaded zone has a single Stab Flank lead SFP_b, and a single box Load Flank lead LFP_b, such that SFP_b equals SFP_p1, and LFP_b equals LFP_p. Thus the female threaded zone has a unique portion wherein the width of the teeth of that unique portion increase continuously. The female threaded zone is of the self-locking type without any variation in the lead between flanks all over its axial length.

At the end of make-up, both all stab flanks and all load flanks are in interfering contact in the first portion of the male threaded portion. It means that the full extent of the first portion of the male threaded portion is in self-locking make-up arrangement with the female threaded zone. As of VPEST location, contact between the male and the female load flanks is conserved in the second portion, but the contact between the male and female stab flanks disappears in that second portion. When contact is lost, threaded portions are not anymore in a self-locking make-up arrangement. Thus the full extent of the second portion of the male threaded zone is not in self-locking engagement. Thus, thread in the first portion are wedge thread, whereas the second section is not a wedge thread, because wedge ratio determined on the pin member in the second section is equal 0.

This known connection is provided with a metal-to-metal seal in order to reach premium seal performance for both liquid and gas. Male and female members each respectively comprise a sealing surface which can cooperate with each other in tightening contact (also termed contact with interference) when the threaded zones cooperate following self-locking make-up. The cooperation zone in tightening contact of the sealing surfaces is located between the terminal surface of the male end and the threaded zones. This known connection is made with long tubular component carrying the male member at both end, with a short tubular component (the latter being termed a coupling) carrying female members, such that teeth with the minimum width teeth are imperfect close to the transition with the non-threaded portions. Imperfect thread have a lower height than the regular height of the other threads.

However, the known self-locking threading connections of the art meet with certain limitations in current applications where only semi premium connection are required, and only liquid seal is required. There is a need for a connection able to provide high make up torque and that withstand semi premium standard in term of sealability, while being suitable in application semi flush or flush, where maximum outer diameter of the box member, is less than 6%, and better less than 3%, over the nominal outer diameter of the tubular components comprising said connection.

There is a need for a cost effective connection providing wider tolerance for machining while reaching ISO 13679:2002 CAL-I liquid seal guarantees. There is also a need for a connection less prone to damage during handling and running, with a longer lifetime due to higher acceptable number of make & brake cycles.

For this reason, the aim of the invention is to provide a semi-premium, semi-flush connection having self locking thread, such that the locking thread provide a seal sufficient to withstand seal to liquid.

More precisely, the invention provides a threaded connection comprising a first and a second tubular component, the first tubular component being provided with a pipe body and a male member at a distal end of the pipe body, the second tubular component being provided with another pipe body and a female member at a distal end of that pipe body, such that a male member comprises, on its external peripheral surface, at least one male threaded zone and finishes in a male terminal surface, and a female member comprises, on its internal peripheral surface, at least one female threaded zone and finishes in a female terminal surface, the male threaded zone comprising a male thread having a first portion in which the width of the thread crest (CWTp) increases in a direction oriented from the male terminal surface towards the pipe body of the first tubular component, the tooth closest to the male terminal surface presenting a minimum crest width value (CWTpmin) of the male thread, and the female threaded zone comprising a female thread having a second portion in which the width of the thread crest (CWTb) increases along a direction oriented from the female terminal surface towards the pipe body of the second tubular component, the tooth closest to the female terminal surface presenting a minimum crest width value (CWTbmin) of the female thread, wherein each tooth of the first portion is between two adjacent teeth of the second portion when the connection is made up, and wherein only part of the first portion cooperate with only a part of the second portion in accordance with a self-locking make-up arrangement in order to provide a locking region in the threaded connection.

A technical advantage of a connection according to the invention is that no specific make up torque chart is required to follow during assembly; such that an operator has only to check if a minimum make up torque target value is reached. This advantage is significant in order to lower cost for running that type of connection.

Another advantage of the present invention is that the make up torque is achievable with rig's torque capacity, and that the connection may be made up in less than one turn.

Another advantage of the present invention, is atop reaching ISO 13679:2002 CAL-I standard for liquid sealing, the connection also fulfilled API RP 5C:2015 CAL-I series A and B testing protocols to guaranty liquid seal also under bending and external pressure condition.

A threaded zone may preferably be a single start continuous helical profile emerging from a tronconical machined surface of respectively the male and female member.

"only a part" means that not all of the teeth of the first portion are in a self-locking make-up arrangement, some teeth of the first portion are not in contact, either considering their load flanks and or their stab flanks, with the corresponding teeth of the second portion. Teeth of the first portion that are not in self-locking arrangement have at least one of their load flank or stab flank not in contact with any corresponding surface of the second portion. Respectively, teeth of the second portion that are not in self-locking arrangement have at least one of their load flank or stab flank not in contact with any corresponding surface of the first portion.

The part of the first portion cooperating with the part of the second portion in a self-locking make-up arrangement are having teeth such that
   load flanks of those parts of the first and second portion contact, and
   stab flanks of those parts of the first and second portion contact, and
   at least one of the root or crest of that part of the first portion contact with respectively the crest or the root of that part of the second portion. Those contacts are continuous all along the locking region.

The pipe body of the first tubular component may be provided at an opposed end with a female member, such that the female member has the same characteristic as the female member of the second tubular component. Such type of pipe body is said integral or flush or semi-integral or semi flush, depending on a ratio between the maximum outer diameter of the connection with the nominal diameter of the pipe body. But the invention is also applicable on "T&C", where a first tubular is provided at both ends with a male member, and where the second tubular is provided at both ends with a female member.

Preferably, the male member may be swaged and the female member may be expanded prior to the machining of the thread.

Optional complementary or substitutional characteristics of the invention are given below.

Preferably, the locking region may comprise a number (n) threads in self-locking arrangement, wherein first and second portions comprise a number of threads strictly greater than the number (n) threads of the locking region.

The male threaded zone may have a male distal portion defined by a different wedge ratio than in the locking region, the distal portion including the tooth that is closest to the male terminal surface, the male distal portion being adjacent to the first portion.

The female threaded zone may have a female distal portion defined by a different wedge ratio than in the locking region, the female distal portion including the tooth that is closest to the female terminal surface, the female distal portion being adjacent to the second portion.

For example, the tooth of the female distal portion which is closest to the female terminal surface may have the same crest width as the tooth of the male distal portion which is closest to the male terminal surface (CWTbmin=CWTpmin).

According to a first embodiment of the invention, the lead of the male stab flanks (SFP_p) may be constant in the first portion and get a distinct value in a distal portion of the male threaded zone, such distinct value being lower or equal to the value of the lead of the male load flanks (LFP_p) which remains constant in the first and distal portions, the male distal portion being adjacent to the first portion.

Similarly, according to that first embodiment of the invention, the lead of the female stab flanks (SFP_b) may be constant in the second portion and get a distinct value in a distal portion of the female threaded zone, such distinct value being lower or equal to the value of the lead of the female load flanks (LFP_b) which remains constant in the second and distal portions, the female distal portion being adjacent to the second portion According to a second alternative embodiment of the invention, the lead of the male load flanks (LFP_p) may be constant in the first portion and get a distinct value in a distal portion of the male threaded zone a value greater or equal to the value of the lead of the male stab flanks (SFP_p) which remains constant in the first and distal portions, the male distal portion being adjacent to the first portion. Similarly, according to that second embodiment of the invention, the lead of the female load flanks (LFP_b) may be constant in the second portion and get a distinct value in a distal portion of the female threaded zone a value greater or equal to the value of the lead of the female stab flanks (SFP_p) which remains constant in the second and distal portions, the female distal portion being adjacent to the second portion.

The male threaded zone may also have a male proximal portion defined by a different wedge ratio than in the locking region, the proximal portion including the tooth that is farthest to the male terminal surface, the male proximal portion being adjacent to the first portion.

The female threaded zone may have a female proximal portion defined by a different wedge ratio than in the locking region, the proximal portion including the tooth that is farthest to the female terminal surface, the female proximal portion being adjacent to the second portion.

According to a third embodiment of the invention, the lead of the male stab flanks (SFP_p) may also be constant in the first portion and get in a proximal portion of the male threaded zone a value lower or equal to the value of the lead of the male load flanks (LFP_p) which remains constant in the first and proximal portions, the male proximal portion being adjacent to the first portion. Similarly, according to that third embodiment of the invention, the lead of the female stab flanks (SFP_b) may also be constant in the second portion and get in a proximal portion of the female threaded zone a value lower or equal to the value of the lead of the female load flanks (LFP_b) which remains constant in the second and proximal portions, the female proximal portion being adjacent to the second portion.

According to an alternative to the third embodiment, a fourth embodiment of the invention is such that the lead of the male load flanks (LFP_p) may also be constant in the first portion and get in a proximal portion of the male threaded zone a value greater or equal to the value of the lead of the male stab flanks (SFP_p) which remains constant in the first and proximal portions, the male proximal portion being adjacent to the first portion. Similarly, according to that fourth embodiment of the invention, the lead of the female load flanks (LFP_b) may also be constant in the second portion and get in a proximal portion of the female threaded zone a value greater or equal to the value of the lead of the female stab flanks (SFP_b) which remains constant in the second and proximal portions, the female proximal portion being adjacent to the second portion.

For example, a fifth embodiment of the invention is a combination of both first and third embodiments. Alternatively, a sixth embodiment of the invention is a combination of both second and fourth embodiments.

Preferably, the wedge ratio may change at two locations on both the male threaded zone and the female threaded zone.

For example, the lead of the male stab flanks may change at two locations on the male threaded zone, and the female stab flanks may change at two locations on the female threaded zone, and the lead of male load flanks and the lead of the female load flanks remain constant along the whole male threaded zone, and respectively female threaded zone. According to that example, change locations on the male threaded zone do not correspond to the change locations on the female threaded zone.

Preferably, the design rules for the male threaded zone may require dovetail thread, such that the minimum value (CWTpmin) of the width of the tooth which is closest to the male terminal surface fulfill at least one of the below equations (a) $0.8202 * TH \leq CWTp\,min$ (b) $CWTp\,min$ $\leq BTG - (PLH * \tan(\alpha)) - ([PLH + (LFP\_p1 * \tan(\emptyset)) - (BTG * \tan(\emptyset))] * \tan(\alpha))$ Where: BTG is the female minimum thread gap, of a thread gap not involved in the locking region $BTG = SFP\_p1/2 - (n/2 * (LFP_{p1} - SFP_{p1}))$ Wherein
n is the number of locking thread of the locking region
SFP_p1 is stab flank lead in the first portion
LFP_p1 is load flank lead in the first portion $LFP_{p1} - SFP_{p1}$ is also called wedge ratio TH is a nominal thread height in the first portion
PLH is the distance from the pin pitch line to root in the first portion.
The pin pitch line is determined by all points at mid height of the flanks, when considering the flanks having a constant lead in that first portion.
α is the load and respectively stab flank angle with a perpendicular to the axis of the connection
Ø is the taper angle, wherein the taper angle is an angle between a generatrix of male and female threaded zones and the axis of the connection Preferably, male and female threaded zones have a taper generatrix forming a taper angle with the axis of the connection in the range from 1 degree to 5 degrees. Preferably, a taper value may be ⅛ or ⅙, corresponding respectively to taper angle of 3.6° and 4.8°.

As an example of thread design, the teeth of the male and female threaded zones may have a dovetail profile, and crests and roots of the teeth of both the male and female threaded zones being parallel to the axis of the threaded connection. For example, the teeth of the male and female threaded zones may also have a dovetail profile such that respective load flanks and stab flanks being at an angle of a same angle value a compare to a perpendicular to an axis of the connection, that a angle being between 1° and 6°.

Preferably, the crest of the teeth of the male threaded zone and the roots of the female threaded zone may be in interfering contact in the locking region, such that the diameter interference at the root/crest interference may be above 0.0025 times the pipe body nominal outer diameter.

A connection according to the present invention is preferably free from any distal abutment surface, such that a free end of the male member remains away from the female member, and respectively a free end of the female member remains away from the male member, when the connection is made up.

An advantage of the present invention is that male and female member may be free of any additional sealing surfaces, like metal-to-metal seals, beside the locking region.

For example, the part of the first portion and respectively the part of the second portion of the threaded zones of respectively the male member and the female member cooperating by self-locking in the locking region may each represent more than 30% and less than 80%, and preferably more than 50% in number of teeth of their respective threaded zone.

A number of teeth is preferably determined along a longitudinal sectional view of the threaded zone, along a longitudinal axis of the pipe body. The non-locking teeth may provide structural support.

For example, all teeth of the male and or female threaded zone may have the same height, except the tooth presenting a minimum crest width.

BRIEF DESCRIPTION OF THE DRAWINGS

The characteristics and advantages of the invention are disclosed in more detail in the following description made with reference to the accompanying drawings.

DETAILED DESCRIPTION

Figure 1:
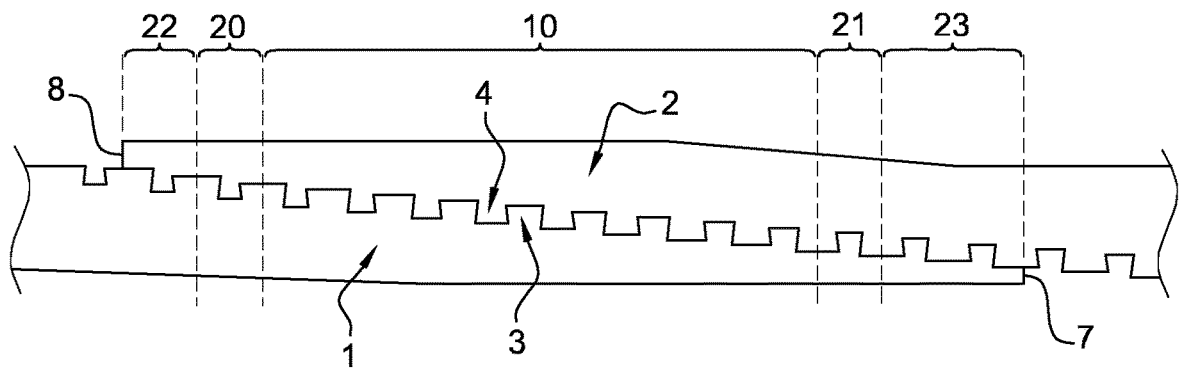
FIG. 1 is a partial diagrammatic view of a connection comprising a self-locking threading in accordance with the invention.

The threaded tubular connection shown in FIG. 1 comprises a tubular component provided with a male member 1 and a tubular component provided with a female member 2. Both male member 1 and female member 2 are provided with tapered threaded zones 3, 4 that cooperate for mutual connection by make-up of the two components. FIG. 1, the threaded connection is shown fully made up.

The male member finishes in a male terminal surface 7, forming an axial free end of the male member or pin face. The male terminal surface 7 is also a free axial surface of the first tubular component. The female member 2 finishes in a female terminal surface 8, forming an axial free end of the female member or box face. The female terminal surface 8 is also a free axial surface of the second tubular component. The male terminal surface 7 and the female terminal surface 8 are oriented radially with respect to the longitudinal axis X of the connection. None of the male terminal surface 7 and the female terminal surface 8 are placed in abutment contact at the end of make up.

Preferably, both tubular component are integral, as they are both provided with a pipe body, a male member at one first distal end of the pipe body, and at an opposite distal end of the pipe body with a female member. Both tubular components are made out of steel. Threaded zones are respectively machined, wherein a surface treatment is provided to the female member only, and dope is additionally placed around the male member before make up. Alternatively, both the male member and the female member may be surface treated. For example, a surface treatment may be Zinc Phosphate treatment.

For example, grade of the material is between 80 ksi (550 MPa) and 140 ksi (965 MPa). For example, grade is above 100 ksi (690 MPa), for example 125 ksi (860 MPa).

According to the present invention, connection efficiency under both tension and compression are above 70% of the pipe body yield strength.

Pipe body may be with an outer diameter between 3½" (88.90 mm) to 16" (406.4 mm), and pipe body wall width of 8 to 22 mm.

According to examples of the invention, the pipe body outer diameter may be 13⅝" (330.2 mm), with a pipe body wall width of 0.625"(15.8 mm).

Threaded zones may be single start. Each threaded zone may have a unique single threaded spire. A unique threaded spire means a spire with no interruption.

When made up, the connection of the invention is comprising a locking portion 10 wherein respective part of the threaded zones 3 and 4 are in a known "self-locking" configuration wherein both male threaded zone and female threaded zone present at least in that locking region 10 a progressive variation of the axial width of the thread crests and of the intervals between the threads such that a progressive axial tightening is produced during make-up until a final locking position.

The term "self-locking" configuration means the characteristics detailed below for the teeth in the locking region. The male threads (or teeth) 32, like the female threads (or teeth) 42, have a constant lead although their crest width respectively decreases towards their respective terminal surface 7, 8 such that during make-up, some of male 32 and female 42 threads (or teeth) finish by locking into each other in a determined position. Thread in the locking configuration, are such that all the stab flanks and all the load flanks of the male threads (or teeth) lock against one another respectively the stab flanks and the load flanks of the corresponding female threads (or teeth).

At the end of makeup, in the locking region 10, there is no axial gap between axial flanks, both Load flanks and Stab flanks. Axial flanks define essentially radially compared to the axis of the connection. Moreover, design of the connection according to the invention is such that there is no radial gap between at least male thread crest and female thread root in the locking region. Thus, the locking region forms a seal by generating enough contact to trap dope and withstand high pressure. Crests and roots are in interfering contact, and axial flanks interfere too.

According to the present invention, only a specific number of threads of each of the male 32 and female 42 threads are in that specific locking configuration, and are involved in the locking portion 10. The locking portion 10 is away from the first and last thread of the threaded zone. At least first and last thread of both the male 32 and female 42 threads are not in a locking configuration.

Figure 6:
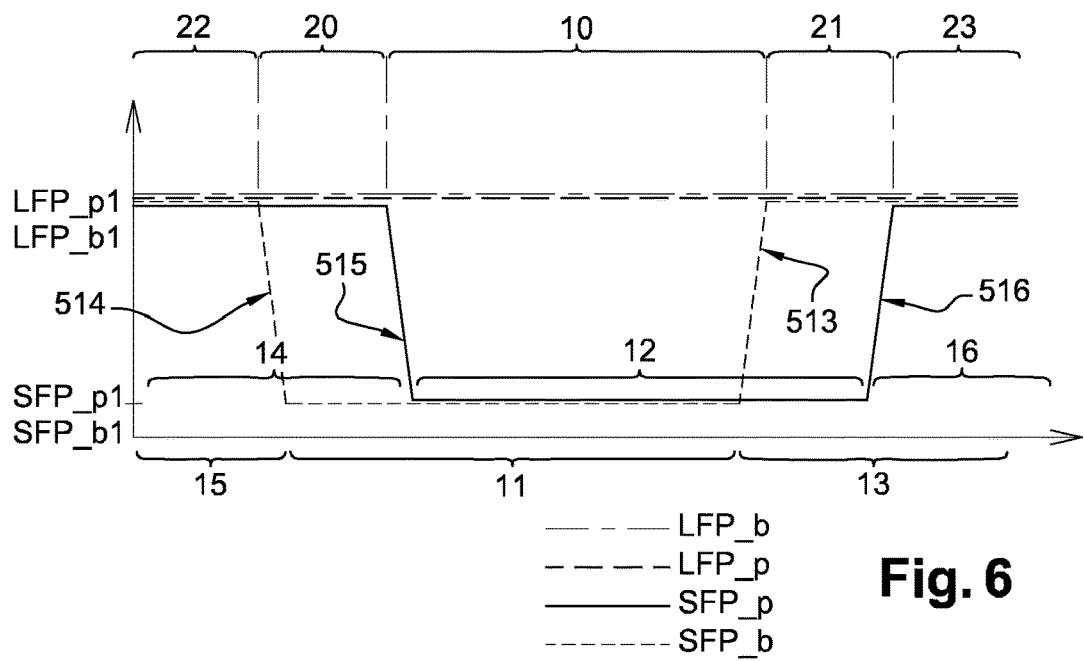
FIGS. 6 to 9 are graphs according to different embodiments of the invention showing the evolution of the leads between the load flanks and the stab flanks for respectively the male member and female member along the threads of the male and female member in accordance with FIG. 1 as a function of the distance from the distal end surface of the male member, when the connection is made up. Graphs of FIGS. 6 to 9 represent lead values of respectively male stabbing flanks (SFP_p), male loading flanks (LFP_p), female stabbing flanks (SFP_b), and female loading flanks (LFP_b) along y-axis, with x-axis representing the location of the thread along a longitudinal axis of the tubular component, between box face 8 and pin face 7 when the connection is made-up.

More precisely, FIG. 6, the male threaded zone 3 comprise a first portion 11 wherein the lead SFP_p between the male stabbing flanks 31 is constant at a value SFP_p1, and the lead LFP_p between the male load flanks 30 is also constant but at a different value LFP_p1. In the example of FIG. 6, LFP_p1 is strictly superior to SFP_p1. For example, in one embodiment of the invention:

LFP_p1=9.7 mm

SFP_p1=9.4 mm

Thus a wedge ratio of the first portion, which is the difference between the load flank lead and the stab flank lead here equals 0.3 mm.

Within the scope of the invention, other stab flank lead and load flank lead values are acceptable.

Similarly the female threaded zone 4 comprise a second portion 12 wherein the lead LFP_b between the load flanks 41 is constant at a value LFP_b1, and the lead SFP_b between the stabbing flanks 40 is also constant but at a different value SFP_b1, with the feature that the lead between the load flanks 41 is greater than the lead between the stabbing flanks 40.

Further, as represented FIG. 6, the respective leads SFP_p1 and SFP_b1 between the male 31 and female 40 stabbing flanks are equal and smaller than the respective leads LFP_p1 and LFP_b1 between the male 30 and female 41 load flanks, which are themselves equal.

Figure 3:
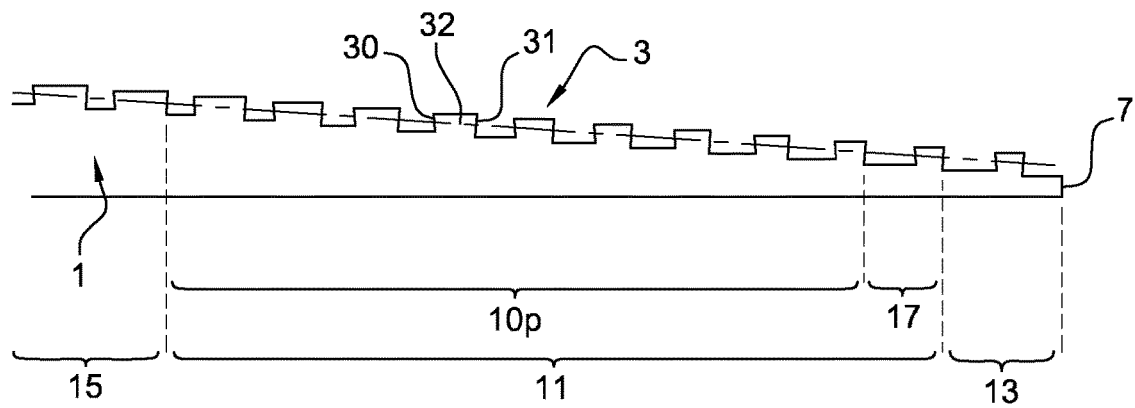
FIG. 3 is a detailed longitudinal sectional view of a male member of a tubular component of a connection in accordance with the invention.

FIGS. 3 and 6, the male threaded zone 3 comprises, in addition to the first portion 11, a male distal portion 13, adjacent to the first portion 11 and located on the side of the first portion closest to the male free end surface 7. The male threaded zone 3 also comprises a male proximal portion 15 adjacent to the first portion 11, but located on the other side of the first portion, the one farthest of the male free end surface 7. Each of the male distal portion 13 and the male proximal portion 15 comprise a portion of thread covering at least 360°, and preferably two turns. The male distal portion 13 and the male proximal portion 15 distinguish from the first portion 11, by the lead of at least one of the stab flank and/or the load flank is/are distinct from the values observed in the first portion.

In the example of FIG. 6, Male distal portion 13 and the male proximal portion 15 distinguish from the first portion 11 by only the lead of the stabbing flank SFP_p, the lead of the load flank LFP_p remaining at a same value LFP_p1 all along the threaded portion. In particular, FIG. 6, lead of the male stabbing flanks in the distal portion 13 and the proximal portion 15 are equal and equal to the lead of the male load flanks LFP_p1. And the lead of the male stabbing flank in the first portion 11 reach a value SFP_p1 inferior to the male load flank lead LFP_p1.

Thus, a male wedge ratio along the male distal and proximal portions equals 0, whereas a non-null wedge ratio exists within the male first portion 11.

Figure 7:
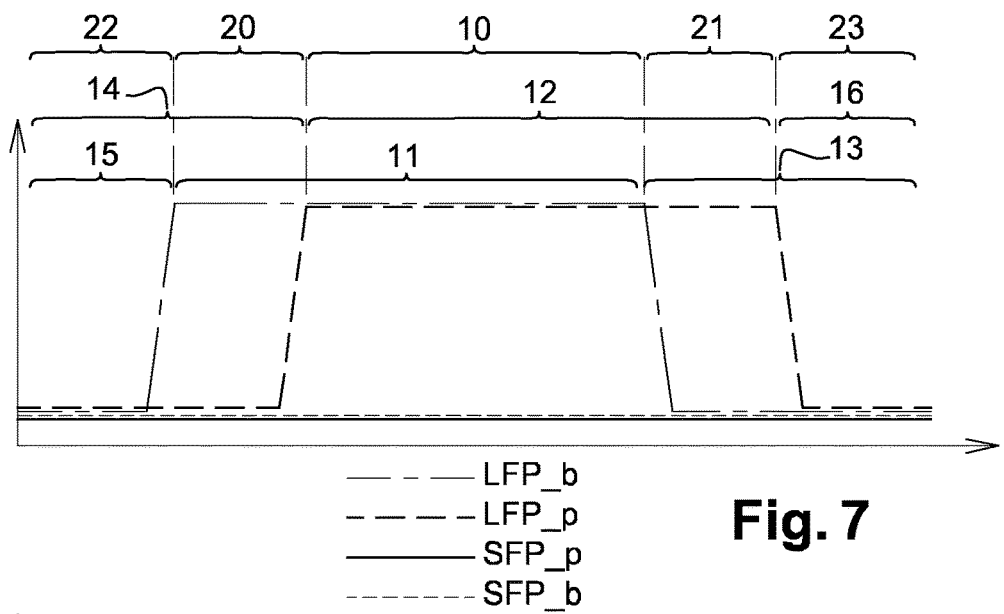

As an alternative to the embodiment of FIG. 6, FIG. 7 proposes a strictly positive, non-null, wedge ratio in the first portion and null wedge ratio along the male distal and proximal portions obtained by the sole increase of the Load flanks lead in the first portion relative to both distal and proximal male portions. According to this alternative embodiment, along both distal and proximal male portions, Load Flank lead equals Stab Flanks lead, Stab Flank leads remaining constant all along the threaded portion.

Along another embodiment of the invention, alternative to FIG. 6, as shown FIG. 8, wedge ratio in the male distal and proximal portion is strictly above 0, non-null, and strictly below the wedge ratio observed along the first portion. The lead of the stab flank within the male distal and respectively proximal portion being lower to the lead of the load flanks in that male distal portion and respectively proximal portion, while the lead of the Load flank in the male distal portion remains constant and equals to the lead of the Load flanks in the first portion.

Another embodiment according to the invention could cover a varying wedge ratio within the male distal and proximal portion, such varying value remaining strictly below the wedge ratio of the first portion. Values of wedge ratio and/or pattern of variation of wedge ratio along the distal and proximal portion may be identical or not.

Figure 2:
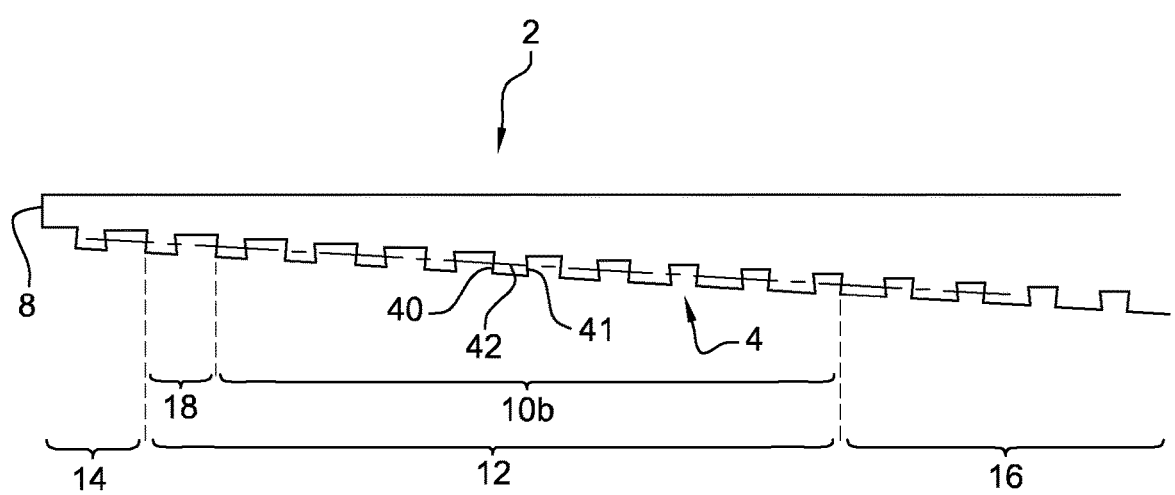
FIG. 2 is a detailed longitudinal sectional view of a female member of a tubular component of a connection in accordance with the invention.

Similarly, FIGS. 2 and 6, the female threaded zone 4 comprises, in addition to the second portion 12, a female distal portion 14, adjacent to the second portion 12, located on the side of the second portion closest to the female free end surface 8. The female threaded zone 4 comprises a female proximal portion 16 adjacent to the second portion 12, but located on the other side of the second portion, the one farthest of the female free end surface 8. Each of the female distal portion 14 and the female proximal portion 16 comprises a portion of thread covering at least 360°, and preferably two turns. The female distal portion 14 and the female proximal portion 16 distinguish from the second portion 12, by the lead of at least one of the stab flank and/or the load flank is/are distinct from the values observed in the second portion.

FIG. 6, female distal portion 14 and the female proximal portion 16 distinguish from the second portion 12, by only the lead of the stabbing flank SFL_b, the lead of the load flank LFP_b remaining at a same value LFP_b1 all along the threaded portion. In particular, lead of the female stabbing flanks in the distal portion 14 and the proximal portion 16 are equal and equal to the lead of the female load flanks LFP_b1, which is also equal to the male Load Flanks LFP_p1. The lead of the female stabbing flanks in the second portion 12 reach a value SFP_b1 inferior to the male load flank lead LFP_b1.

More specifically, LFP_b1=LFP_p1 and SFP_b1=SFP_p1.

Figure 8:
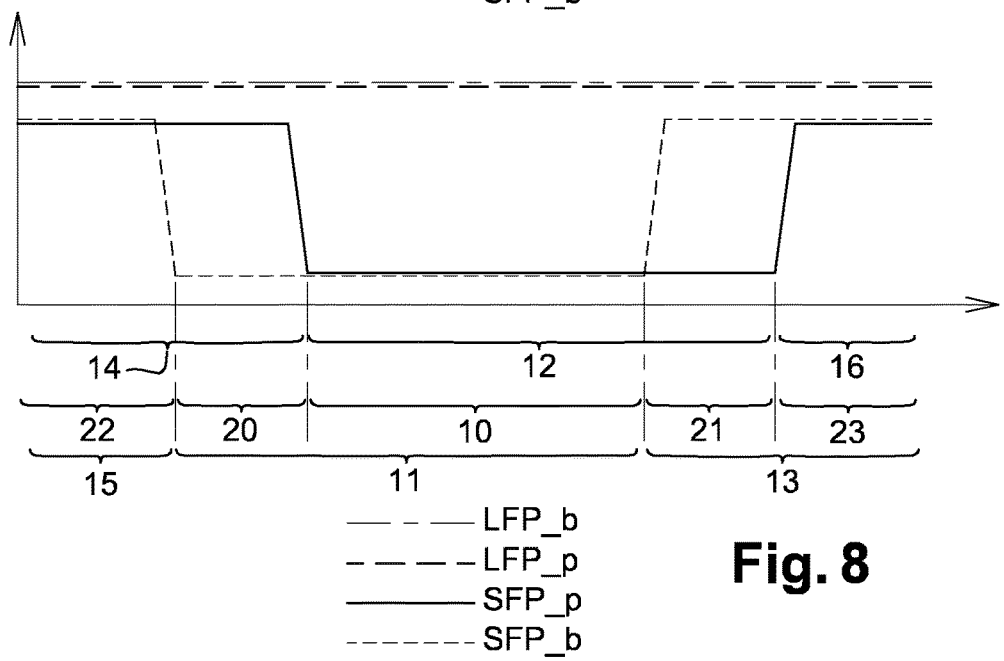

FIGS. 7 and 8, female distal and proximal portions present the same type of variation of the Stab flanks lead and Load flanks lead as is the case in the male treaded portion, except that the location of changes in the female leads are not superimposed along a longitudinal axis of the connection, with the location of those changes in the male leads.

According to the invention, when the connection is made up, at least one of a tooth of the male proximal portion 15 is engaged in an interval between two adjacent teeth of the second portion 12, therefore defining a transition region 20 and/or a tooth of the female proximal portion 16 is engaged in an interval between two adjacent teeth of the first portion11, therefore defining a transition region 21.

A tooth engaged in an interval is to be interpreted as at least a 360° tooth engaged in at least a 360° interval. In the transition region 20 and 21, there is no contact between at least one of the stabbing flanks and/or the load flanks.

Therefore, when a connection according to the invention is made up, a female locking part 10b of the second portion 12 is engaged in a self-locking configuration with the male threaded zone 3, female part 10b being adjacent to the female proximal portion 16;

And/or a male locking part 10p of the first portion 11 engage in a self-locking configuration the female threaded zone 4, male part 10p being adjacent to the male proximal portion 15.

Locking parts 10p and 10b are locking threads defining the locking region.

Then in the made up position, respectively the male distal portion 13 and the remainder part 17 of the first portion 11, that one that is not involved in the locking region 10, are both engaged in the intervals of the female proximal portion 16;

and/or the female distal portion 14 and the remainder part 18 of the second portion 12, that one that is not involved in the locking region 10, are both engaged in the intervals of the male proximal portion 15.

According to the above "and/or" options, FIGS. 1 to 3 are a representation of the "and" option.

In the example of FIGS. 1 to 3, on both side of the locking portion 10, there are transition regions 20, 21, where at least stab flanks start not interfering each other. Transition region 20 is where female remainder part 18 of the second portion 12 engage the male proximal portion 15. Transition region 21 is where male remainder part 17 of the first portion 11 engage the female proximal portion 16.

The first portion 11 is consisting of a male locking part 10p and a remainder part 17. The second portion 12 is consisting of a female locking part 10b and a remainder part 18.

FIGS. 1 to 3, from the transition region 21 to the male free end 7, the threaded connection comprises an internal threaded region 23, where the male distal portion 13 engages the female proximal portion 16. Symmetrically, from the transition region 20 and the female free end 8, the threaded connection comprises an external threaded region 22, where the male proximal portion 15 engages the female distal portion 14. In the internal threaded region 23 and external threaded region 22, a positive clearance exists between respective male and female stab flanks. For example, that clearance is at least 1 mm, and for example below 5 mm.

Preferably, the locking region 10 locates axially in the middle of the threaded connection. Thus part 10p of the first portion 11 locates axially in the middle of the male threaded zone 3, and respectively part 10b of the second portion 12 locates axially in the middle of the female threaded zone 4. As for an example, the locking region comprises 8 threads where the threaded connection in full comprises at least 10 threads, and preferably more than 14 threads, for example 16 threads. According to the present invention, with n=number of threads of the locking region Then the number of threads of the connection is for example at least more than 1.25*n; and more preferably at least more than 1.75*n; for example 2 times*n.

According to a first embodiment of the invention, FIG. 6, the male stab flank lead SFP_p change respectively in the distal portion 13 and the male proximal portion 15, in order to reach a value that is the load flank lead value LFP_p1 as set in the first portion, and the female stab flank lead change respectively in the distal portion 14 and the female proximal portion 16, in order to reach a value that is the load flank lead value LFP_p1 as set in the first portion, and both the male and female load flank lead is constant all over the connection, respectively equals to LFP_p1.

Variation of the male stab flank lead SFP_p curve between proximal portion 15 and first portion 11 is located at 515 and respectively reversely at 516 between first portion 11 and male distal portion 13. Variation 513 and 514 are sudden, and appear in less than one turn, preferably less than 180°. Variation of the female stab flank lead SFP_b curve between proximal portion 16 and second portion 12 is located at 513 and respectively reversely at 514 between second portion 12 and female distal portion 14. Variation 514 and 513 are sudden, and appear in less than one turn, preferably less than 180°.

Variations 514 and 515 occurring at a different axial location within the threaded connection, the transition region 20 defines between variations 514 and 515. Symmetrically variations 513 and 516 occurring at a different axial location within the threaded connection, the transition region 21 defines between variations 513 and 516. Transition region 20 and 21 in accordance with the invention enables to conserve a good effective locking portion despite variations in the axial positioning of the assembled elements due to machining tolerances, the effective seal of the locking region being efficient over several teeth of that locking portion.

According to that first embodiment, within the internal thread portion 23 and external threaded portion 22, both male and female thread have the same load flank lead and stab flank lead. Thus, male teeth involved in the internal thread portion 23 have all the same constant crest width CWTpmin as the female teeth involved in the external thread portion 22, which have the same crest width CWTbmin. The internal thread portion 23 comprises the teeth of the male distal portion closest to the male terminal surface 7, which are the teeth with the smallest crest width value of the whole male threaded zone 3. The external thread portion 22 comprises the teeth of the female distal portion closest to the female terminal surface 8, which are the teeth with the smallest crest width value of the whole female threaded zone 4. Both teeth have a same crest width minimum value CWTmin=CWTbmin=CWTpmin.

According to the invention, in order to avoid early thread crest interference, during make up, the inventors have discover the need to control by a relation between the teeth crest width and the box rear non-locking thread gap width.

Figure 4:
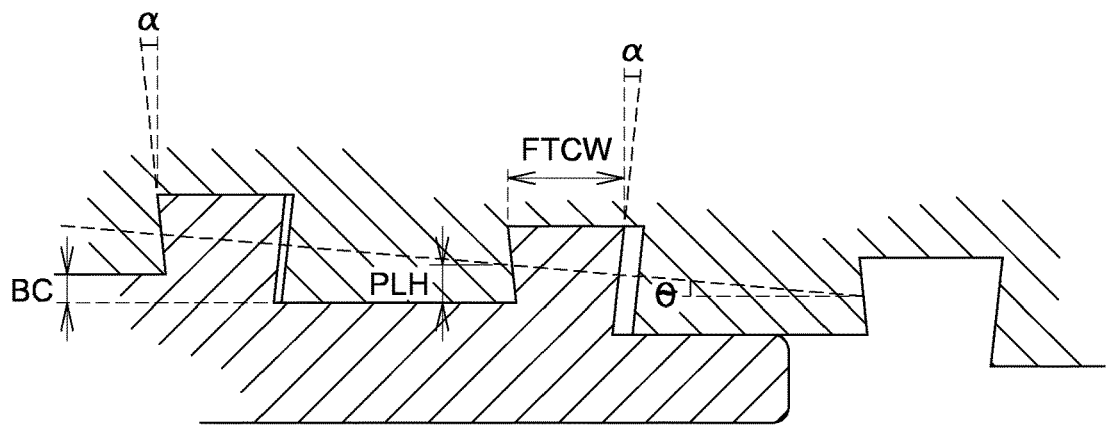
FIG. 4 is a detailed longitudinal sectional view of a connection in accordance with the invention, near the male free end.
Figure 5:
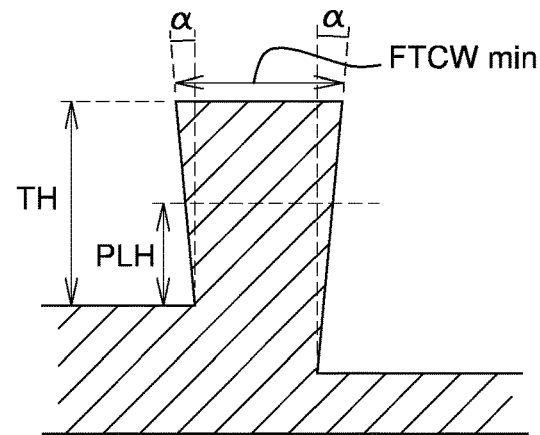
FIG. 5 is a detailed view of a male teeth of a male member in accordance with the invention.

Advantageously and as shown in FIGS. 4 and 5, the male and female threads (or teeth) have a dovetail profile. This profile enables to avoid the risk of jump-out, which corresponds to the male and female threads coming apart when the connection is subjected to large bending or tensile stresses. More precisely, the geometry of the dovetail threads increases the radial rigidity of their assembly compared with threads, which are usually termed "trapezoidal" threads wherein the axial teeth width reduces from the base to the crest of the threads. Advantageously, the load flanks of the thread connect to the thread crest and to the adjacent thread root by roundings such that these roundings reduce the stress concentration factor at the foot of the load flanks and thereby improve the fatigue behavior of the connection.

FIG. 4, the crests of the teeth and the roots of the roots of the male and female threaded zones are parallel to the longitudinal axis X of the threaded connection. This facilitates machining.

Along a longitudinal section of the threaded connection, both load flank and stab flank present a straight profile. Load flank and stab flank are respectively making an angle α with a vertical to the longitudinal axis X. Load flank angle value equals stab flank angle value, while being opposed and defined on opposed sides of a vertical to the longitudinal axis X. For example angle α is comprised between 1° and 6°, for example equals 5°. Thus the crest of a teeth is always the largest dimension of that teeth when considering the width of a teeth along the longitudinal axis X.

The threaded connection is tapered so as to facilitate the progress of make-up. A pitch line is having a taper angle Ø with the longitudinal axis X. The pitch line defines as passing through the aligned center of the flanks of the male threaded zone having a same lead value all along the connection. According to the first embodiment, the lead of the load flanks remains at a same value all along the male threaded zone, thus the pin pitch line defines as passing through the aligned center of the load flanks. For example the taper angle Ø is for example comprised between 1 and 10°, for example equals 4.7°.

Advantageously, the first gap of the female proximal portion 16 not engaging a teeth is having a gap width BTG according to the below formula $$BTG = \frac{SFP\_p1}{2} - \left(\frac{n}{2} * (LFP_{p1} - SFP_{p1})\right)$$

Wherein
n is the number of locking thread of the locking region
SFP_p1 is stab flank lead in the first portion
LFP_p1 is load flank lead in the first portion $LFP_{p1} - SFP_{p1}$ is also called wedge ratio TH is a nominal thread height in the first portion
PLH is the distance from the pin pitch line to root in the first portion.
When stab flank lead is constant in the first portion, pin pitch line is determined with points at mid-height of the stab flanks. To the opposite, when stab flank lead is varying in the first portion, and the load flank lead is constant in the first portion, pin pitch line is determined with points at mid-height of the load flanks.
α is the load and respectively stab flank angle with a perpendicular to the axis of the connection
Ø is the taper angle, wherein the taper angle is an angle between a generatrix of male and female threaded zones and the axis of the connection
BTG is also the female minimum thread gap of thread teeth not involved in the locking region, for example of thread gap of the female proximal portion 16.
The crest width of a tooth, or largest width dimension of that tooth, is such that the minimum value (CWTpmin) of the width of the crest of the tooth which is closest to the male terminal surface 7 fulfill at least one of, and preferably both of the below equations $$0.8202 * TH \leq CWTpmin \quad \text{(a)}$$

$$CWTpmin \leq BTG - (PLH * \tan(\alpha)) - \quad \text{(b)}$$
$$([PLH + (LFP\_p1 * \tan(\emptyset)) - (BTG * \tan(\emptyset))] * \tan(\alpha))$$

For example, according to the invention, and for at least the first embodiment of FIG. 6:

1.804 mm≤CWTpmin≤3.262 mm

And BTG=3.5 mm

FIG. 7, is an alternative embodiment of FIG. 6, wherein difference with FIG. 6 mainly explain as differential variation of the load flank lead and stab flank lead. According to a second embodiment of the invention, FIG. 7,
the male load flank lead LFP_p change respectively from the distal portion 13 and the male proximal portion 15, in order to reach a value that is the load flank lead value LFP_p1 as set in the first portion, and
the female load flank lead LFP_b change respectively from the distal portion 13 and the male proximal portion 15, in order to reach a value that is the load flank lead value LFP_p1 as set in the first portion, and
both the male and female stab flank lead being constant all over the connection, respectively equals to SFP_p1.

FIG. 8, is another alternative embodiment of FIG. 6, wherein difference with FIG. 6 mainly explain as the load flank lead of the female and male member in their respective distal portion and proximal portion is greater than the value of both the male and female load flank lead. Load flank lead is constant all over the connection, respectively equals to LFP_p1.

Figure 9:
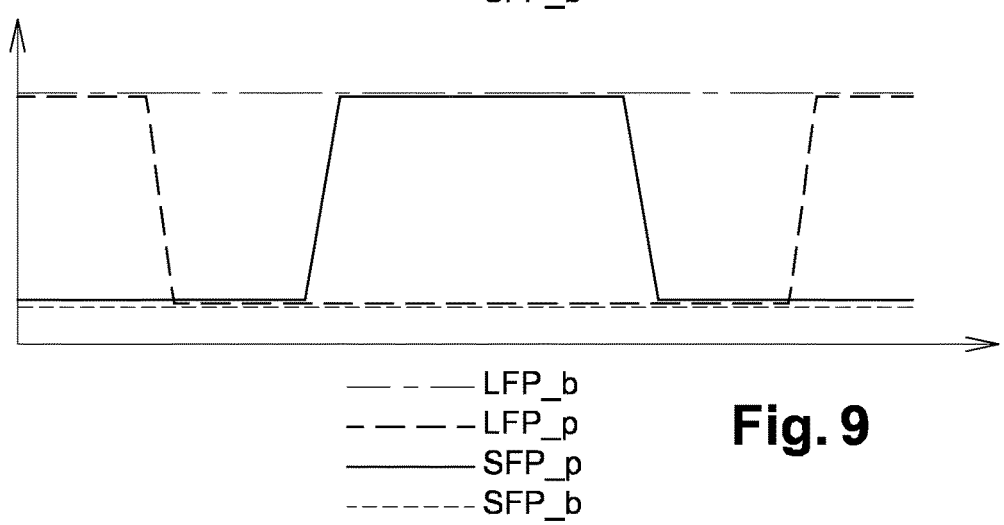

FIG. 9 is combining male leads change as of FIG. 6 together with female leads change as of FIG. 7, with the constant feature of the axial location of the male and female leads changes being not superimposed.

The invention encompass threaded connection comprising a locking portion, adjacent to a transition portion, the transition portion being adjacent to a distal or proximal portion, such that teeth are not in self-locking engagement in both the transition portion and at least one of the distal and proximal portion. For example, teeth not in self-locking arrangement are such that stab flanks are not interfering, and male or female tooth having the same minimal crest width.

The invention encompass threaded connection comprising a locking portion being adjacent at both axial ends of the locking portion to transition portions, such that teeth are not in self-locking engagement in both transition portions.

The minimum make-up torque required may be between 55 000 ft.lbs (74570 N.m) and 70 000 ft.lbs (94 907 N.m).

The invention claimed is:
1. A threaded connection comprising:
a first and a second tubular component, the first tubular component being provided with a pipe body and a male member at a distal end of the pipe body, the second tubular component being provided with another pipe body and a female member at a distal end of that pipe body, such that a male member comprises, on an external peripheral surface, at least one male threaded zone and finishes in a male terminal surface, and a female member comprises, on an internal peripheral surface, at least one female threaded zone and finishes in a female terminal surface,
the male threaded zone comprising a male thread having a first portion in which the width of a thread crest increases continuously over an entirety of the first portion in a direction oriented from the male terminal surface towards the pipe body of the first tubular component, a tooth closest to the male terminal surface presenting a minimum crest width value of the male thread, and the female threaded zone comprising a female thread having a second portion in which the width of a thread crest increases continuously over an entirety of the second portion along a direction oriented from the female terminal surface towards the pipe body of the second tubular component, a tooth closest to the female terminal surface presenting a minimum crest width value of the female thread, wherein each tooth of the first portion is between two adjacent teeth of the second portion when the connection is made up, and wherein only part of the first portion cooperate with only a part of the second portion in accordance with a self-locking make-up arrangement in order to provide a locking region in the threaded connection.

2. The threaded connection according to claim 1, wherein the locking region comprises a number of threads in self-locking arrangement, wherein first and second portions comprise a number of threads strictly greater than the number of threads of the locking region.

3. The threaded connection according to claim 1, wherein the male threaded zone has a male distal portion defined by a different wedge ratio than in the locking region, the distal portion including the tooth that is closest to the male terminal surface, the male distal portion being adjacent to the first portion.

4. The threaded connection according to claim 3, wherein the female threaded zone has a female distal portion defined by a different wedge ratio than in the locking region, the female distal portion including the tooth which is closest to the female terminal surface, the female distal portion being adjacent to the second portion.

5. The threaded connection according to claim 4, wherein the tooth of the female distal portion which is closest to the female terminal surface has the same crest width as the tooth of the male distal portion which is closest to the male terminal surface.

6. The threaded connection according to claim 1, wherein a lead of a male stab flanks is constant in the first portion and gets a distinct value in a distal portion of the male threaded zone, the distinct value being lower or equal to the value of a lead of a male load flanks which remains constant in the first and distal portions, the male distal portion being adjacent to the first portion.

7. The threaded connection according to claim 1, wherein a lead of the male load flanks is constant in the first portion and gets a distinct value in a distal portion of a male threaded zone a value greater or equal to the value of a lead of a male stab flanks which remains constant in the first and distal portions, the male distal portion being adjacent to the first portion.

8. The threaded connection according to claim 1, wherein the male threaded zone has a male proximal portion defined by a different wedge ratio than in the locking region, the proximal portion including the tooth that is farthest to the male terminal surface, the male proximal portion being adjacent to the first portion.

9. The threaded connection according to claim 1, wherein the female threaded zone has a female proximal portion defined by a different wedge ratio than in the locking region, the proximal portion including the tooth that is farthest to the female terminal surface, the female proximal portion being adjacent to the second portion.

10. The threaded connection according to claim 1, wherein a lead of a male stab flanks is constant in the first portion and gets in a proximal portion of the male threaded zone a value lower or equal to the value of a lead of a male load flanks which remains constant in the first and proximal portions, the male proximal portion being adjacent to the first portion.

11. The threaded connection according to claim 1, wherein a lead of a male load flanks is constant in the first portion and gets in a proximal portion of the male threaded zone a value greater or equal to the value of a lead of a male stab flanks which remains constant in the first and proximal portions, the male proximal portion being adjacent to the first portion.

12. The threaded connection according to claim 1, wherein a wedge ratio changes at two locations on both the male threaded zone and the female threaded zone.

13. The threaded connection according to claim 1, wherein a lead of a male stab flanks changes at two locations on the male threaded zone and a female stab flanks changes at two locations on a female threaded zone, and wherein a lead of male load flanks and a lead of a female load flanks remain constant along the whole male threaded zone, and respectively female threaded zone.

14. The threaded connection according to claim 1, wherein the male threaded zone comprise dovetail thread, and the minimum value (CWTpmin) of the width of the tooth which is closest to the male terminal surface fulfill at least one of the below equations $$0.8202 * TH \leq CWTpmin \qquad (a)$$

$$CWTpmin \leq BTG - (PLH * \tan(\alpha)) - \qquad (b)$$
$$([PLH + (LFP\_p1 * \tan(\emptyset)) - (BTG * \tan(\emptyset)] * \tan(\alpha))$$

wherein: BTG is the female minimum thread gap, of a thread gap not involved in the locking region $$BTG = \frac{SFP\_p1}{2} - \left(\frac{n}{2} * (LFP_{p1} - SFP_{p1})\right)$$

wherein:
n is a number of locking thread of the locking region,
SFP_p1 is stab flank lead in the first portion,
LFP_p1 is load flank lead in the first portion, $LFP_{p1}-SFP_{p1}$ is also called wedge ratio TH is a nominal thread height in the first portion,
PLH is a distance from the pin pitch line to root in the first portion,
the pin pitch line is determined by all points at mid height of the flanks, the flanks having a constant lead in that first portion,
α is a load and respectively stab flank angle with a perpendicular to the axis of the connection, and
Ø is a taper angle, wherein the taper angle is an angle between a generatrix of male and female threaded zones and the axis of the connection.

15. The threaded connection according to claim 1, wherein the male and female threaded zones have a taper generatrix forming an angle with the axis of the connection in the range from 1 degree to 5 degrees.

16. The threaded connection according to claim 1, wherein the teeth of the male and female threaded zones have a dovetail profile, and the crests of the teeth and roots of the male and female threaded zones are parallel to the axis of the threaded connection.

17. The threaded connection according to claim 1, wherein the teeth of the male and female threaded zones have a dovetail profile such that respective load flanks and stab flanks being at an angle of a same angle value a compare to a perpendicular to an axis of the connection, that α angle being between 1° and 6°.

18. The threaded connection according to claim 1, wherein only one of the crest of the teeth of the male threaded zone with roots of the female threaded zone, or roots of the teeth of the male threaded zone with the crests of the female threaded zone are interfering, in the locking region, such that the diameter interference at the root/crest interference may be above 0.0025 times the pipe body nominal outer diameter.

19. The threaded connection according to claim 1, wherein the threaded connection is free from any distal abutment surface, a free end of the male member being away from the female member, and respectively a free end of the female member being away from the male member.

20. The threaded connection according to claim 1, wherein both male and female member are free of any additional sealing surfaces beside the locking region.

21. The threaded connection according to claim 1, wherein the threaded connection is semi flush, and the first and a second tubular component are integral, each first and second tubular component comprising a male member and a female member.

22. The threaded connection according to claim 1, wherein the part of the first portion and respectively the part of the second portion of the threaded zones of respectively the male member and the female member cooperating by self-locking in the locking region each representing more than 30% and less than 80%, in number of teeth of the respective threaded zone.

23. The threaded connection according to claim 1, wherein all teeth of the male and or female threaded zone have the same height, except the tooth presenting a minimum crest width.

24. The threaded connection according to claim 1, wherein the male threaded zone and the female threaded zone are respectively a single continuous thread.

25. The threaded connection according to claim 1, wherein the male threaded zone and the female threaded zone are single start thread.

* * * * *